United States Patent Office 3,463,010
Patented Aug. 26, 1969

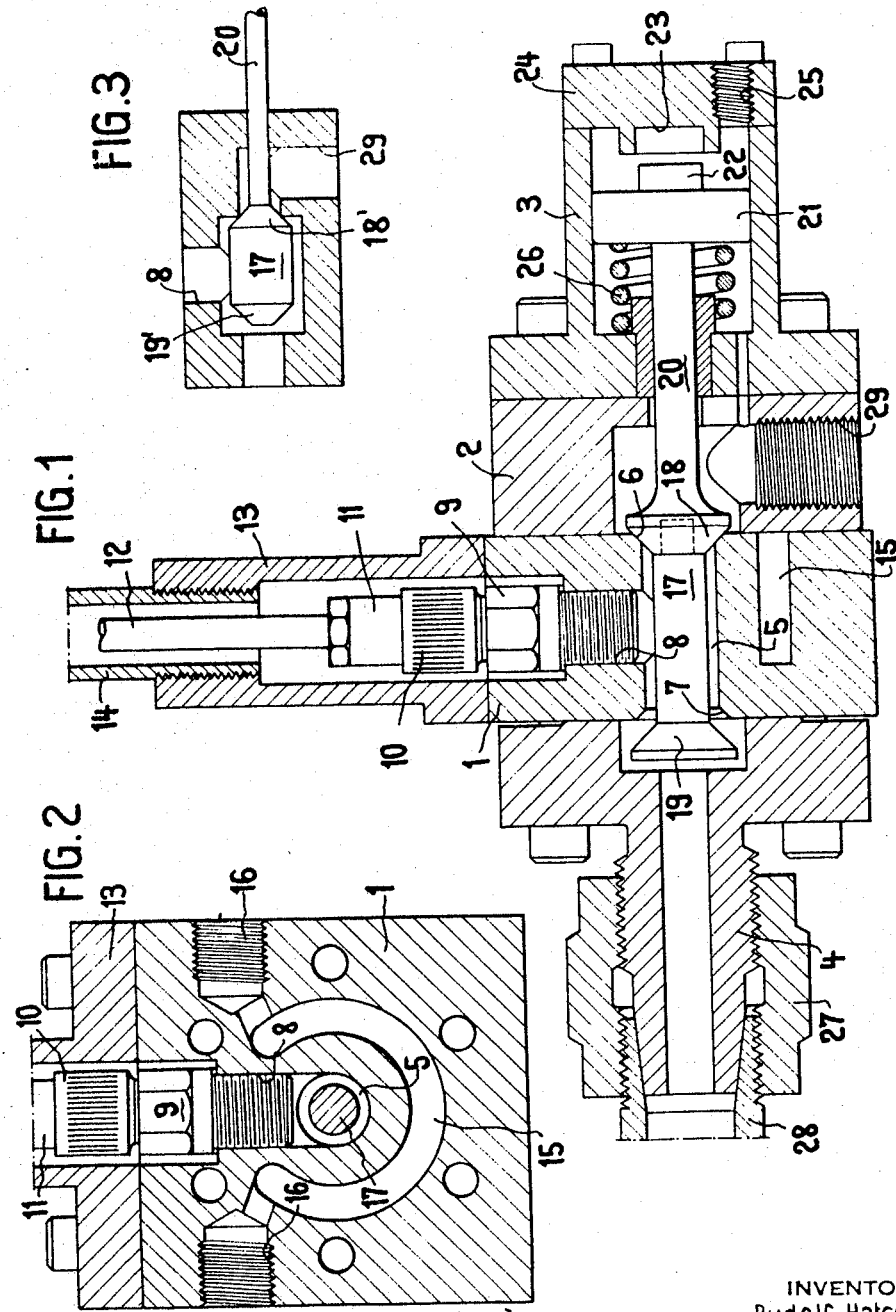

3,463,010
INDICATOR ADAPTOR AND METHOD FOR OPERATING IT
Rudolf Hatschek, Freiburg, Switzerland, assignor to Vibro-Meter AG, Freiburg, Switzerland
Filed Apr. 21, 1967, Ser. No. 632,748
Claims priority, application Germany, Apr. 25, 1966, V 30,935
Int. Cl. G01l 7/18
U.S. Cl. 73—396
6 Claims

ABSTRACT OF THE DISCLOSURE

A indicator adaptor for connection to the indicator pipe of a cylinder of a combustion motor has a canal passing through from a connection piece to an exhaust in which two valve seats are disposed behind each other. A valve body is displaceable by forced control between said valve seats, and a pressure measuring instrument is connected between said valve seats.

This invention relates to an indicator adaptor for connection to the indicator pipe of a cylinder of a combustion motor, comprising a canal passing through from a connection piece to an exhaust, two valve seats in said canal, a valve body selectively engageable with the valve seat near the connection piece or the valve seat near the exhaust, and a pressure measuring instrument connected to a canal portion between said valve seats.

A prior indicator adaptor of this type has a piston freely displaceable in the canal and forming the valve body, the explosion pressure of the motor acting at one side and an adjustable counter pressure acting at the other side of this piston. The purpose of this arrangement is to effect reversal of the valve body only when the explosion pressure exceeds the counter pressure whereby only pressure peaks are measured and indicated. With this disposition it is impossible to maintain the valve body in any predetermined position independently of the pressures acting on the same in order to apply a calibrating pressure from the exhaust to the pressure measuring instrument as an example. Further, it is impossible to maintain the valve body in an intermediate position during a period of any desired length for scavening the canal of the indicator adaptor.

Another prior indicator adaptor has a canal passing through the adaptor casing. A single valve in this canal usually closed by a spring, is adapted to be opened by a pressure measuring instrument screwed into the free end of the canal. Further, it is possible to slightly loosen the indicator adaptor from the indicator pipe whereby a direct exhaust for explosion gases is formed between the indicator pipe and the indicator adaptor loosely screwed thereto. However, no efficient and simple scavening of the valve seat is possible with this indicator adaptor, because the valve may only be opened when the pressure measuring instrument is connected thereto and it is impossible to use the adaptor for applying calibrating pressure to the instrument.

This invention aims in providing an indicator adaptor of the above type allowing easy and efficient scavening and calibration of the instrument when the adaptor is connected to the running motor. The indiactor adaptor according to this invention is characterized by control means for forced control of the valve body into each of its closed positions and into intermediate positions. Due to the forced control of the valve body the following positively selectable operating conditions are possible:

(1) Complete closure of the valve seat near the cylinder of the motor. In this position calibrating pressures may be applied to the pressure measuring instrument from the exhaust through the open second valve seat.

(2) Closure of the valve seat near the exhaust for interconnection of the pressure measuring instrument with the cylinder of the motor.

(3) Slow transfer of the valve body from the one to the other valve seat or maintaining the valve body in an intermediate position for scavening the indicator adaptor with explosion gases from the cylinder.

The forced control may preferably be effected by means of a piston, while the normal rest position with the measuring instrument separated from the cylinder may be determined by a spring.

The invention will now be explained in detail and by way of example with reference to the accompanying drawing wherein FIG. 1 is a longitudinal section of the adaptor,
FIG. 2 is a cross section of the adaptor and
FIG. 3 is a schematic illustration of a modified valve of the adaptor.

The casing of the adaptor has a block-shaped central portion 1 assembled by means of screws with a ring-shaped exhaust portion 2, the flanges of an actuating cylinder 3 and a connection piece 4. The central portion 1 of the adaptor casing has a canal 5 passing through it, conical valve seats 6 and 7 respectively being provided at the ends of this canal. A pressure measuring instrument 9, for instance a piezo-electric pressure transducer, is screwed into a screw-threaded transversal bore 8 of the casing portion 1. In a well-known manner a plug 11 of a measuring cable 12 is connected to the instrument 9 by means of a screw cap 10. A protecting tube 13 for the cable connection is screwed to the casing portion 1, the tube 13 being itself connected to a protecting mantle 14 for the cable 12. The casing portion 1 is provided with a ring groove 15 coaxially disposed to the canal portion 5, both ends of which communicating with screw bores 16 for connection of a cooling water circuit. The cooling water canal formed by the groove 15 open at one side thereof is closed by the exhaust portion 2.

A valve body 17 extends through the canal portion 5, which is fixed to two valve cones 18 and 19. The valve cone 18 is made in one piece with a valve rod 20 carrying an actuating piston 21 at its opposite end. The piston 21 has an extension 22 adapted to enter into a cylindrical recess 23 of the cylinder cover 24. The cylinder cover 24 has a connection bore 25 for a control conduit through which pressure medium, preferably pressure air may be admitted into the cylinder 3 at the right of piston 21. The piston 21 illustrated in its operating position is usually maintained in a right-hand end position by a pressure spring 26, for which the extension 22 engages the recess 23 and for which the valve cone 19 engages the valve seat 7 while the valve cone 18 is spaced from the valve seat 6.

The connection piece 4 has a coupling sleeve 27 with right-handed and left-handed screw, by means of which the pressure piece may be connected to the standardized connecting piece 28 of the indicator pipe or the indicator cock respectively.

As already mentioned, the adaptor is illustrated in FIG. 1 in its operating or measuring position in which the pressure measuring instrument 9 communicates with the indicator pipe and consequently with the cylinder space with the valve cone 19 lifted off, and transmits the measuring values required for evaluation to a central control and evaluation device. The valve cone 18 is thereby applied with high pressure against the valve seat 6 so that a falsification of the measuring result by leakage to the exhaust 29 cannot occur.

After termination of the measurement admittance of pressure medium into the cylinder 3 is discontinued so that the piston 21 is now first shifted to the right by spring 26 until the extension 22 enters into the recess 23 and is braked by the cushion of compressed air formed in the recess 23. The piston 21 and consequently the valve rod 20 with the valve seats 18 and 19 are stopped in an intermediate position in which both valve cones are lifted off their seats and thus the canal passing through from the connection piece 4 to the exhaust 29 remains open. Therefore, thorough scavening of this canal by exhausting gases, particularly combustion gases occurs for this intermediate position. After a conveniently measured time the pressure cushion leaks from the recess 23 so that the valve returns into its rest position for which the valve cone 19 rests on its seat 7 while the valve cone 18 is completely lifted from its seat 6. Thus the pressure measuring instrument 9 is disconnected from the cylinder space and is consequently protected from continuous straining by pressure peaks and sooting between separate measuring periods.

When the valve is in its rest position, a calibrating pressure source may be connected to the exhaust 29 as mentioned, of which the pressure is applied to the pressure measuring instrument 9 for static calibration thereof.

The valve form illustrated in FIG. 1 with the valve cones engageable against the valve seats of the canal portion 5 from outside has the advantage that the valve cone 19 is pressed towards its seat 7 by the operating pressure of the cylinder so that even in case of rupture of the spring 26 no continuous action of pressure peaks onto the measuring instrument 9 may occur. However, if one wants to do without this additional security the embodiment acording to the schematical FIG. 3 may be used, whereby the valve cones 18' and 19' of a valve body 17' may be applied against the valve seats from inside.

What I claim is:

1. An indicator adaptor for connection to the indicator pipe of a cylinder of a combustion motor, comprising means defining a fluid passageway passing through from a connection piece to an exhaust and two valve seats in said passageway, one of said valve seats being near said connection piece and the other of said valve seats being near said exhaust, a valve body displaceable from a first closed position in engagement with the valve seat near the connection piece through intermediate positions to a second closed position in engagement with the valve seat near the exhaust, a pressure measuring instrument connected to a portion of said fluid passageway between said valve seats, control means outside said passageway and rigidly connected to said valve body for forced control of the valve body into each of its said closed positions and into said intermediate positions.

2. An adaptor according to claim 1, comprising, spring means for returning said valve body into its first closed position, said control means being adapted for lifting said valve body from its said first closed position on the seat near the connection piece, and a braking device for control of delayed return of the valve body into its first position.

3. An adaptor according to claim 2, wherein said control means comprise a remote-control cylinder having a piston rod connected to said valve body.

4. An adaptor according to claim 1, comprising a central casing portion including the said portion of the passageway and the said valve seats, a connection piece and an exhaust piece, said control means being connected to said valve body through said exhaust piece.

5. An adaptor according to claim 4, wherein said central casing portion has a bore transversely extending from said portion of the passageway, said pressure measuring instrument being accommodated in said bore.

6. An adaptor according to claim 4, wherein said central casing portion has a canal for a cooling medium, this canal being formed by a groove open at one end surface of the central casing portion and closed by said exhaust piece.

References Cited
UNITED STATES PATENTS

| | | | |
|---|---|---|---|
| 574,964 | 1/1897 | Waldner | 73—115 |
| 2,632,474 | 3/1953 | Jones. | |

LOUIS R. PRINCE, Primary Examiner

DONALD O. WOODIEL, Assistant Examiner

U.S. Cl. X.R.

73—115, 420